UNITED STATES PATENT OFFICE.

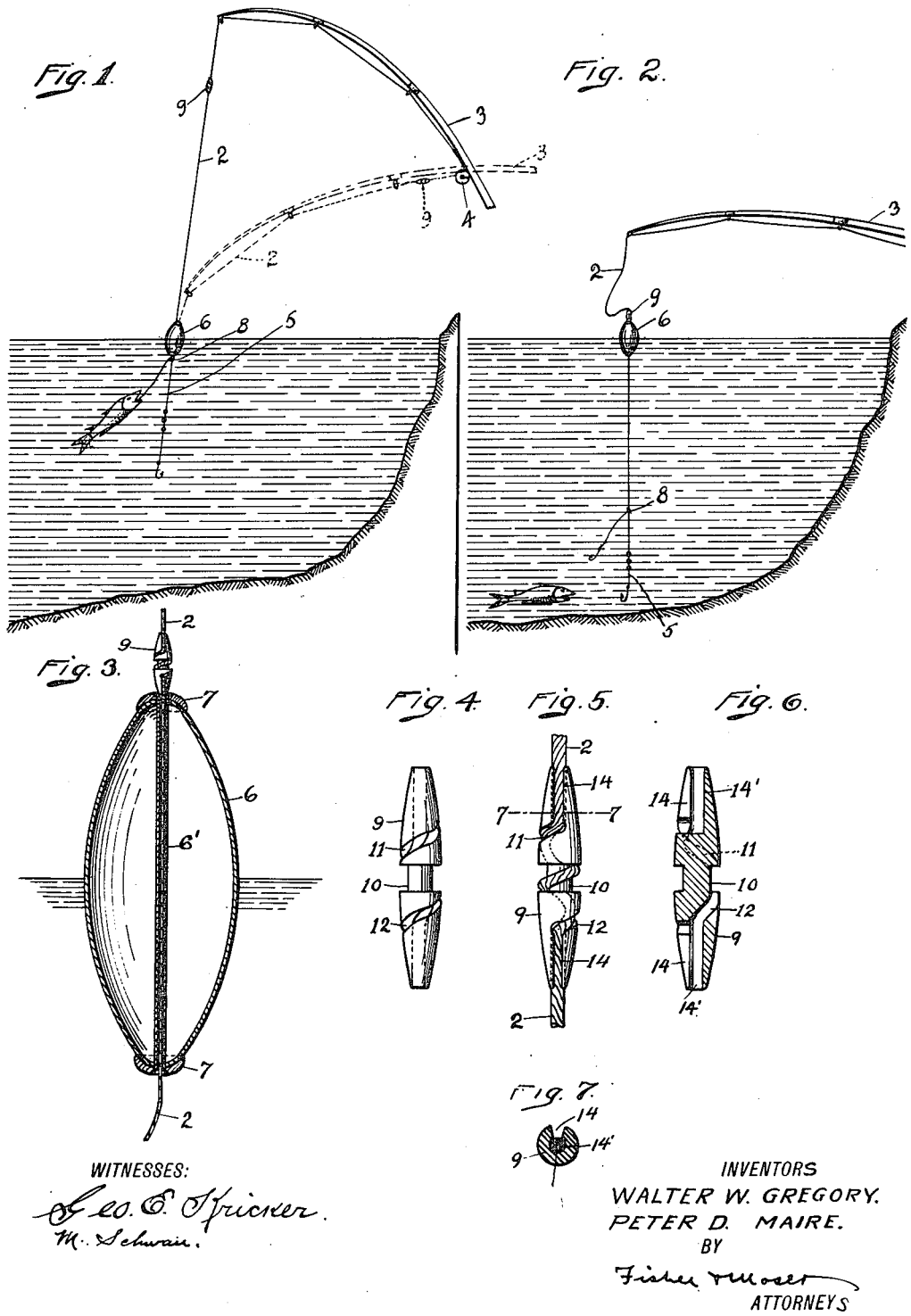

PETER D. MAIRE AND WALTER W. GREGORY, OF LAKEWOOD, OHIO; SAID MAIRE ASSIGNOR TO W. R. WHITE, OF CLEVELAND, OHIO.

FISHING-TACKLE.

1,193,912.  Specification of Letters Patent.  Patented Aug. 8, 1916.

Application filed January 27, 1915. Serial No. 4,584.

*To all whom it may concern:*

Be it known that we, PETER D. MAIRE and WALTER W. GREGORY, citizens of the United States, residing at Lakewood, in the county of Cuyahoga and State of Ohio, have invented certain new and useful Improvements in Fishing-Tackle, of which the following is a specification.

This invention pertains to improvements in fishing-tackle, and the improvement comprises a fishing-line having free-running connection with a bob or float and detachable and adjustable means on the fishing-line to limit the relative movement of said parts, all substantially as herein shown and described and more particularly pointed out in the claims.

In the accompanying drawing, Figure 1 is a view of a fishing rod and fishing-line with a float and stops affixed to the line, the full lines showing the rod raised with the line drawn taut, and the dotted lines showing the rod lowered with the line reeled in but with the float still on the surface of the water. Fig. 2 is a similar view to Fig. 1 but showing the upper portion of the fishing-line slack and the lower or hook end of the line suspended from and carried by the float. Fig. 3 is a longitudinal section of a hollow float sleeved upon a fishing-line and in contacting engagement with an adjustable and detachable stop and supporting member for the fishing-line. Fig. 4 is an enlarged side elevation of our improved adjustable and detachable stop and supporting member which is adapted to coöperate with a float to hold a fishing-line at any desired depth in the water and Fig. 5 is an elevation of said stop showing the opposite side from Fig. 4. Fig. 6 is a longitudinal section of said stop member, and Fig. 7 a cross section thereof on line 7—7, Fig. 5.

This invention aims to meet an angler's requirements in the following particulars; to wit, in adjusting his fishing-line for varied depths of fishing-grounds; in indicating and playing his catch; and in reeling-in and casting the fishing-line. For these purposes, the fishing-line 2, which is secured to the rod 3 or to a reel 4 on the rod, is provided with a leader or weighted hook end 5 as usual, and in addition is supplied with a suitable bob or float 6 of any preferred construction. As shown in Fig. 3 the bob or float comprises an ellipsoidal hollow body of celluloid having a longitudinal tube 6' on its longer axis through which the fishing-line extends in free-running relations. The top and bottom ends of the float are reinforced by caps 7 and the bottom cap engages the knot 8 which connects the leader 5 with the line, said knot marking one stop limit for the float. The other stop limit on the line is marked by an adjustable and detachable device comprising a relatively small cylindrical body 9 of ellipsoidal formation in the present instance, which is particularly distinguished in that it is provided with an annular reduced portion and groove 10 centrally between its ends of double or triple the width of the fishing-line which is adapted to be confined within said groove. Spiral grooves 11 and 12 extend in opposite directions from annular groove 10, each spiral groove being of the same depth as said groove 10 at their point of communication and then of gradually increasing depth until the end of the spiral is reached, which is at the longitudinal axis of the member at the inner end of a central round bore and a straight slot or groove 14 in the side of each tapering end of member 9. The inner end of each slot is slightly enlarged and rounded at its juncture with the spiral groove to permit convenient insertion of the fishing-line, and a straight slot or groove 14 is relatively narrow to pinch the fishing-line. The bottom portion or bore 14' on the axial line of the member is slightly rounded and enlarged to receive the line, but nevertheless the line is still compressed and frictionally held by the walls when seated therein. And notwithstanding that member 9 is relatively small, its full size being approximately as shown in Fig. 3, the fishing-line is completely retired within the grooves or slots below the rounded surface of said member, thereby avoiding obstruction or resistance to the free-running of the said member through the guides and over the reel on the rod and avoiding wear on the line by protecting the turns thereof at the corners of the longitudinal and transverse grooves in member 9.

The arrangement of the grooves and slots as described permits quick and convenient attachment of member 9 upon the line and is accomplished by winding the line first around the central reduced portion formed by annular groove 10 and placing the line into the spiral grooves and then pulling the line into the straight slots 12. When the line is wound only once around in the annular groove 10 from entrance to entrance of the spiral grooves and placed in the grooves as described, the said member is gripped sufficiently to assure a fixed position thereof on the line, that is, it will afford a stop member for the bob or float which will remain fixed on line against all ordinary strains or end pressures, but by using sufficient hand power said member may be forced to slide along the line to establish different adjusted relations of said member to the other stop on the line represented by knot 8. Obviously, a second member identical to member 9 may be used in lieu of said knot.

Annular groove 10 of member 9 is made wide enough to permit the fishing-line to be wound therearound more than once and when given two turns it is impossible to shift said member in either direction on the line and it becomes a definitely-fixed stop and not an adjustable stop on the line, although it is still a detachable member adapted to be removed and replaced at some other point on the line.

The bob or float and the adjustable and detachable stop member coöperate to support the hook end of the fishing-line at any predetermined depth in the water when said member is placed on the line above the float, and any false or true strike by the fish will be plainly indicated by downward movement of the bob or float. Then any take-up or change in play of the fishing-line will be visibly indicated by the position of the stop member 9 relatively to the bob or float which remains on the surface of the water on account of its free-running connection with the fishing-line. When the knot 8 engages the bob or float, the catch is usually landed with a net or otherwise and the bob or float is lifted and carried out with the line. In casting the line, the float or bob is also engaged with knot 8 and consequently occupies a position near the weighted or leader end of the line to contribute its weight in making the cast, but when the bob or float strikes the water it remains on the surface while the hook end of the line drops to the desired depth as predetermined and limited by the stop member 9.

What we claim is:

1. A fishing-line attachment comprising a relatively small cylindrical body having longitudinal slots and axial bores open thereto in its opposite end portions and provided with an annular groove in its central body portion and having spiral surface grooves extending from said annular groove to said longitudinal slots and axial bores.

2. A fishing-line, in combination with a relatively small cylindrical body having longitudinal and spiral surface grooves at opposite ends thereof and an annular groove centrally of the body, said annular groove being of greater width relatively than the longitudinal and spiral grooves to accommodate more than a single winding of the fishing line therearound.

In testimony whereof we affix our signatures in presence of two witnesses.

PETER D. MAIRE.
WALTER W. GREGORY.

Witnesses:
  M. SCHWAN,
  R. B. MOSER.